US012786123B2

(12) United States Patent
Shu et al.

(10) Patent No.: US 12,786,123 B2
(45) Date of Patent: Nov. 3, 2026

(54) METHOD AND APPARATUS FOR LOOKING UP FORWARDING TABLE, STORAGE MEDIUM, AND ELECTRONIC DEVICE

(71) Applicant: ZTE Corporation, Shenzhen (CN)

(72) Inventors: Ye Shu, Shenzhen (CN); Yubao Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 318 days.

(21) Appl. No.: 18/578,924

(22) PCT Filed: Jul. 11, 2022

(86) PCT No.: PCT/CN2022/104902

§ 371 (c)(1),
(2) Date: Jan. 12, 2024

(87) PCT Pub. No.: WO2023/284675

PCT Pub. Date: Jan. 19, 2023

(65) Prior Publication Data

US 2024/0323121 A1 Sep. 26, 2024

(30) Foreign Application Priority Data

Jul. 14, 2021 (CN) ........................ 202110797837.3

(51) Int. Cl.
*H04L 45/76* (2022.01)
*H04L 45/02* (2022.01)
*H04L 45/64* (2022.01)

(52) U.S. Cl.
CPC .............. *H04L 45/76* (2022.05); *H04L 45/02* (2013.01); *H04L 45/64* (2013.01)

(58) Field of Classification Search
CPC ......... H04L 45/00; H04L 45/02; H04L 45/16; H04L 45/54; H04L 45/64; H04L 45/66;
(Continued)

(56) References Cited

U.S. PATENT DOCUMENTS 10,250,552 B1 * 4/2019 Sajassi ................ H04L 41/0663
2016/0277210 A1 * 9/2016 Lin ......................... H04L 45/16
(Continued)

FOREIGN PATENT DOCUMENTS

CN 109756409 A 5/2019
CN 110380966 A 10/2019
(Continued)

OTHER PUBLICATIONS

International Search Report for corresponding application filed Jul. 11, 2022; Mail date Sep. 29, 2022.
(Continued)

*Primary Examiner* — James N Fiorillo
(74) *Attorney, Agent, or Firm* — CANTOR COLBURN LLP

(57) ABSTRACT

A method for looking up a forwarding table includes: controlling a VRF table to be registered to an EVPN, such that the EVPN generates a RT5 route corresponding to a service route, wherein the RT5 route carries an IP prefix Prefix1; in a case of detecting that an IP address of a next hop of the service route is IP1, determining a MAC address M1, which is obtained by performing ARP parsing and corresponds to IP1, as an overlay index of the RT5 route, and advertising the RT5 route to the EVPN; and in a case where a Provider Edge PE3 receives the RT5 route, generating a routing table entry according to Prefix1 carried in the RT5 route, and looking up a MAC forwarding table from a SBD of an IP-VRF instance according to the overlay index M1 of the RT5 route.

20 Claims, 4 Drawing Sheets

(58) Field of Classification Search
CPC ....... H04L 45/74; H04L 45/76; H04L 45/745; H04L 12/46; H04L 12/462; H04L 12/4625; H04L 12/4633; H04L 12/4641; H04L 12/4671; H04L 63/0272
USPC .......................................................... 709/238
See application file for complete search history.

(56) References Cited

U.S. PATENT DOCUMENTS

| | | | | |
|---|---|---|---|---|
| 2017/0289033 | A1* | 10/2017 | Singh | G06F 9/45558 |
| 2018/0013654 | A1* | 1/2018 | Kapadia | H04L 41/0856 |
| 2018/0343228 | A1* | 11/2018 | Wei | H04L 61/103 |
| 2019/0394066 | A1* | 12/2019 | Lin | H04L 12/4641 |
| 2020/0322183 | A1* | 10/2020 | Lin | H04L 45/245 |
| 2020/0396159 | A1* | 12/2020 | Rao | H04L 12/4641 |
| 2021/0168125 | A1* | 6/2021 | Vemulpali | H04L 9/3236 |
| 2025/0274388 | A1* | 8/2025 | Singh | H04L 45/74 |
| 2026/0067208 | A1* | 3/2026 | Semwal | H04L 45/66 |
| 2026/0089096 | A1* | 3/2026 | Narasimhan | H04L 45/34 |
| 2026/0121971 | A1* | 4/2026 | Sajassi | H04L 45/24 |

FOREIGN PATENT DOCUMENTS

| | | | |
|---|---|---|---|
| CN | 112311645 | A | 2/2021 |
| CN | 112565245 | A | 3/2021 |

OTHER PUBLICATIONS

European Search Report for corresponding application EP22841311; Mail date Sep. 12, 2024.
Mackenzie m, et al., “EVPN multi-homing support for L3 services”, Jul. 12, 2021, pp. 1-17, XP015147015.
Rabadan, “IP prefix Advertisement in EVPN”, Sep. 13, 2016, pp. 1-31, XP015115245.
Wang, “ARP/MD Synching and IP Aliasing without IRB”, Apr. 25, 2019, pp. 1-7, XP015132699.

* cited by examiner

METHOD AND APPARATUS FOR LOOKING UP FORWARDING TABLE, STORAGE MEDIUM, AND ELECTRONIC DEVICE

The present disclosure is a National Stage Filing of the PCT International Application No. PCT/CN2022/104902 filed on Jul. 11, 2022, which claims priority to Chinese Patent Application No. 202110797837.3, filed with the China National Intellectual Property Administration on Jul. 14, 2021 and entitled "Method and Apparatus for Looking Up Forwarding Table, Storage Medium, and Electronic Device", which is incorporated herein by reference in its entirety.

TECHNICAL FIELD

The present disclosure relates to the field of communications, and in particular to a method and apparatus for looking up a forwarding table, a storage medium, and an electronic device.

BACKGROUND

It encounters a problem when Layer-3 routing of an Ethernet Virtual Private Network (EVPN) network implements aliasing by means of Layer-3 ESIs (where ESI stands for Ethernet Segment Identifier). FIG. 1 is a schematic diagram of an EVPN in the related art of the present disclosure. As shown in FIG. 1, although an aliasing action on PE3 (where PE stands for Provider Edge) may be successful, a packet which is load-balanced by PE3 to PE2 node cannot be forwarded to CE1 (where CE stands for Customer Edge) by PE2, and the basic working principle is described as follows.

Virtual Private Local Area Network (LAN) Service (VPLS) instances are deployed on PE1, PE2 and PE3. The VPLSs of PE1 and PE2 are independent broadcast domains, the VPLS of PE1 is added into IRB1 (where IRB stands for Integrated Routing and Bridging), and the VPLS of PE2 is added into IRB2. PE1 and PE2 are only respectively in Layer-2 interconnection with PE3. IRB1 on PE1 and IRB2 on PE2 are deployed with the same ESI (e.g., ESI1). PE1 and PE2 respectively generate RT1 route (where RT stands for Route Type) and distribute the generated RT1 route to PE3; a corresponding ESI forwarding is formed on PE3, and the next hop is PE1 and PE2.

The existing Layer-3 ESI technology can effectively solve the problem of network-side protection for Layer-3 dual-homing of the CE; however, for ESI all-active, the traffic from PE3 to CET will be pushed to PE2; since there is no local routing to CET on PE2, the MAC forwarding table of the VPLS cannot be found according to the next hop, and therefore the traffic cannot be forwarded to CET from the ESI.

Aiming at the problem in the related art that in the case where the ESI service is busy, the traffic from PE3 to CE1 is pushed to PE2, and since there is no local routing to CE1 on PE2, the MAC forwarding table of the VPLS cannot be found according to the next hop, resulting in that PE3 cannot forward the traffic to CE1 from the ESI, no effective solution has been proposed at present.

Therefore, there is a need for improvements in the related art to overcome the deficiencies in the related art.

SUMMARY

The embodiments of the present disclosure provide a method and apparatus for looking up a forwarding table, a storage medium, and an electronic device, which may at least solve the problem that in the case where the ESI service is busy, the traffic from PE3 to CE1 is pushed to PE2, and since there is no local routing to CE1 on PE2, the MAC forwarding table of the VPLS cannot be found according to the next hop, resulting in that PE3 cannot forward the traffic to CE1 from the ESI.

According to an aspect of the embodiments of the present disclosure, provided is a method for looking up a forwarding table, including: controlling a Virtual Routing and Forwarding (VRF) table to be registered to an Ethernet Virtual Private Network (EVPN), such that the EVPN generates a Route Type-5 (RT5) route corresponding to a service route, wherein the RT5 route carries an IP prefix Prefix1; in a case of detecting that an Internet Protocol (IP) address of a next hop of the service route is IP1, determining a Media Access Control (MAC) address M1, which is obtained by performing Address Resolution Protocol (ARP) parsing and corresponds to IP1, as an overlay index of the RT5 route, and advertising the RT5 route to the EVPN; and in a case where a Provider Edge PE3 receives the RT5 route, generating a routing table entry according to Prefix1 carried in the RT5 route, and looking up a MAC forwarding table from a Supplementary Broadcast Domain (SBD) of an IP-VRF instance according to the overlay index M1 of the RT5 route, wherein the overlay index is an index that is used for performing, in an overlay network, iterative table-lookup for a packet.

According to another aspect of the embodiments of the present disclosure, also provided is an apparatus for looking up a forwarding table, including: a processing module, configured to instruct a Virtual Routing and Forwarding (VRF) table to be registered to an Ethernet Virtual Private Network (EVPN), such that the EVPN generates a Route Type-5 (RT5) route corresponding to a service route, wherein the RT5 route carries an IP prefix Prefix1; an advertising module, configured to, in a case of detecting that an Internet Protocol (IP) address of a next hop of the service route is IP1, determine a Media Access Control (MAC) address M1, which is obtained by performing Address Resolution Protocol (ARP) parsing and corresponds to IP1, as an overlay index of the RT5 route, and advertise the RT5 route to the EVPN; and a lookup module, configured to, in a case where a Provider Edge PE3 receives the RT5 route, generate a routing table entry according to Prefix1 carried in the RT5 route, and look up a MAC forwarding table from a Supplementary Broadcast Domain (SBD) of an IP-VRF instance according to the overlay index M1 of the RT5 route, wherein the overlay index is an index that is used for performing, in an overlay network, iterative table-lookup for a packet.

According to another aspect of the embodiments of the present disclosure, further provided is a computer-readable storage medium storing a computer program, wherein the computer program, when running on a processor, causes the processor to execute the method for looking up a forwarding table.

According to another aspect of the embodiments of the present disclosure, further provided is an electronic device, including a memory, a processor and a computer program stored in the memory and operable on the processor, wherein the processor runs the computer program to execute the described method for looking up a forwarding table.

According to the embodiments of the present disclosure, a VRF table is controlled to be registered to an EVPN, such that the EVPN generates a RT5 route corresponding to a service route, wherein the RT5 route carries an IP prefix Prefix1; in a case of detecting that an IP address of a next hop of the service route is IP1, a MAC address M1, which is obtained by performing ARP parsing and corresponds to IP1, is determined as an overlay index of the RT5 route, and the RT5 route is advertised to the EVPN; and in a case where PE3 receives the RT5 route, a routing table entry is generated according to Prefix1 carried in the RT5 route, and a MAC forwarding table is looked up from a SBD of an IP-VRF instance according to the overlay index M1 of the RT5 route, wherein the overlay index is an index that is used for performing, in an overlay network, iterative table-lookup for a packet. The described technical solution solves the problem that in the case where the ESI service is busy, the traffic from PE3 to CE1 is pushed to PE2, and since there is no local routing to CE1 on PE2, the MAC forwarding table of the VPLS cannot be found according to the next hop, resulting in that PE3 cannot forward the traffic to CE1 from the ESI. By means of the described technical solution, the traffic from PE3 to CE1 can be forwarded to CE1 via the ESI.

BRIEF DESCRIPTION OF THE DRAWINGS

The drawings illustrated herein are intended to provide better understanding of the present disclosure, and constitute a part of the present disclosure. The schematic embodiments of the present disclosure and the description thereof are used to explain the present disclosure, but not to limit the present disclosure improperly. In the drawings.

DETAILED DESCRIPTION

In order to enable those having ordinary skill in the art to understand the solutions of some embodiments of the present disclosure better, hereinafter, the technical solutions in the embodiments of the present disclosure will be described clearly and thoroughly with reference to the accompanying drawings of embodiments of the present disclosure. Obviously, the embodiments as described are only some of the embodiments of the present disclosure, and are not all the embodiments. All other embodiments obtained by those having ordinary skill in the art based on of the embodiments in the present disclosure without creative work shall fall within the scope of protection of the present disclosure.

It should be noted that, the terms "first", "second", etc. in the description, claims and drawings of the present disclosure are used to distinguish similar objects, and do not need to be used to describe a specific order or sequence. It will be appreciated that data used in such a way may be exchanged under appropriate conditions, in order that the embodiments of the present disclosure described here can be implemented in a sequence other than sequences graphically shown or described here. In addition, the terms "comprising/including", "having" or other variants aim to cover non-exclusive inclusion, such that the processes, methods, systems, products or devices including a series of operations or units not only include those operations or units, but also include other factors not listed explicitly, or further include operations or units intrinsic for such processes, methods, articles or devices.

Figure 1:
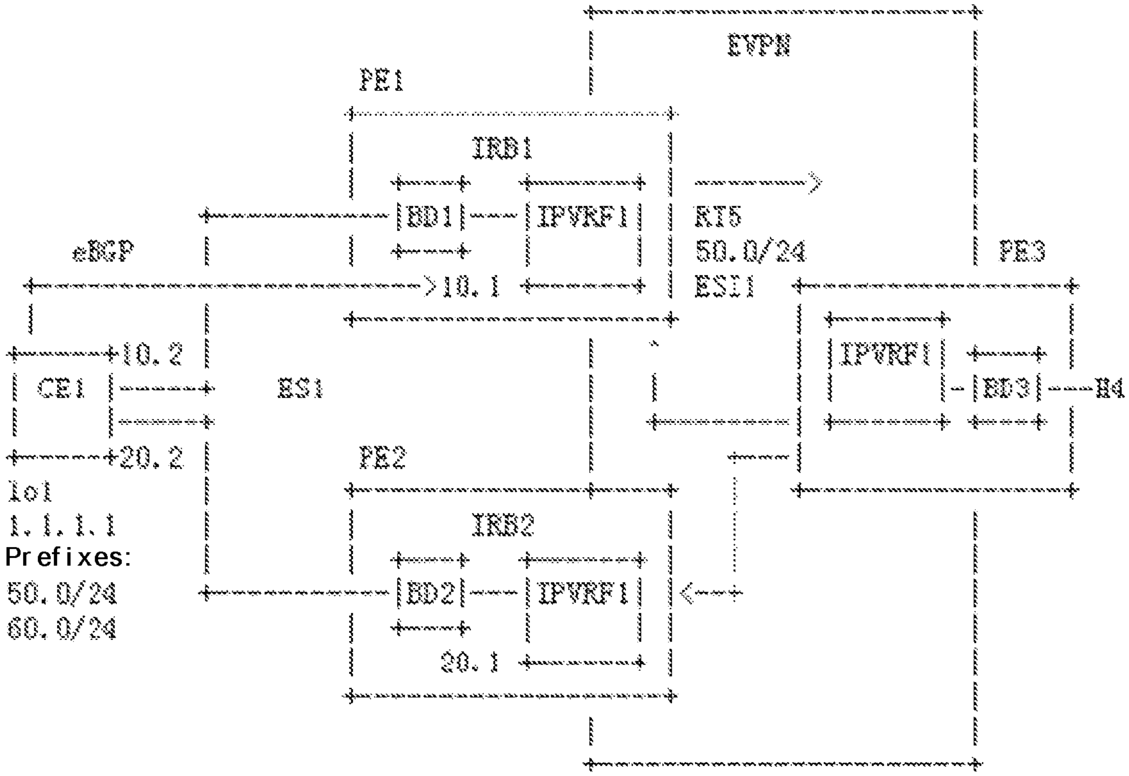
FIG. 1 is a schematic diagram of an EVPN in the related art of the present disclosure.
Figure 2:
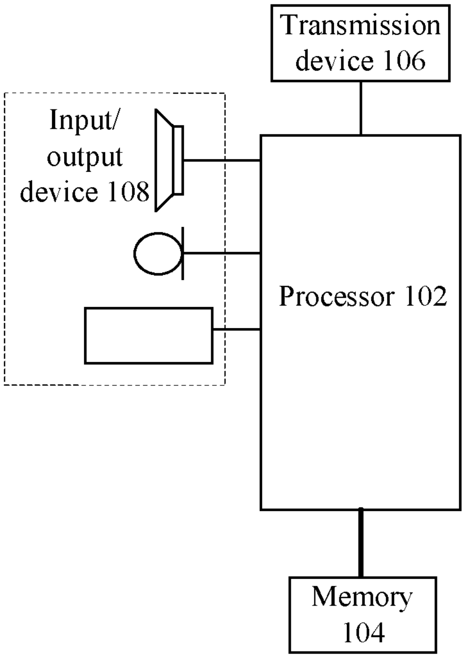
FIG. 2 is a block diagram showing the hardware structure of a computer terminal for implementing a method for looking up a forwarding table according to an embodiment of the present disclosure.

The method embodiment provided in the embodiments of the present disclosure may be executed in a computer terminal or a similar computing device. Taking running on the computer terminal as an example, FIG. 2 is a block diagram showing the hardware structure of a computer terminal for implementing a method for looking up a forwarding table according to an embodiment of the present disclosure. As shown in FIG. 2, the computer terminal may include one or more (only one is shown in FIG. 2) processors 102 (the one or more processors 102 may include, but are not limited to, a Microprocessor Unit (MPU) or a Programmable Logic Device (PLD)) and a memory 104 configured to store data. In an exemplary embodiment, the computer terminal may further include a transmission device 106 for a communication function and an input/output device 108. Those having ordinary skill in the art can appreciate that the structure shown in FIG. 2 is for illustrative purposes only, but not limit the structure of the computer terminal. For example, the computer terminal may also include more or fewer components than that shown in FIG. 2, or have a different configuration than that shown in FIG. 2.

The memory 104 may be configured to store a computer program, for example, a software program and a module of application software, such as a computer program corresponding to the method and apparatus for looking up a forwarding table in the embodiments of the present disclosure. The processor 102 runs the computer program stored in the memory 104, so as to execute various function applications and data processing, that is, to implement the foregoing method. The memory 104 may include a high-speed random access memory, and may also include non-volatile memories, such as one or more magnetic storage devices, flash memories, or other non-volatile solid-state memories. In some instances, the memory 104 may further include a memory remotely located from the processor 102, and the remote memory may be connected to the computer terminal via a network. Examples of the network above include, but are not limited to, the Internet, an intranet, a local area network, a mobile communication network, and combinations thereof.

The transmission device 106 is configured to receive or transmit data via a network. Specific examples of the network may include a wireless network provided by a communication provider of the computer terminal. In an example, the transmission device 106 includes a network interface controller (NIC) which may be connected to other network devices by means of a base station, thereby being able to communicate with the Internet. In an example, the transmission device 106 may be a Radio Frequency (RF) module for communicating wirelessly with the Internet.

Figure 3:
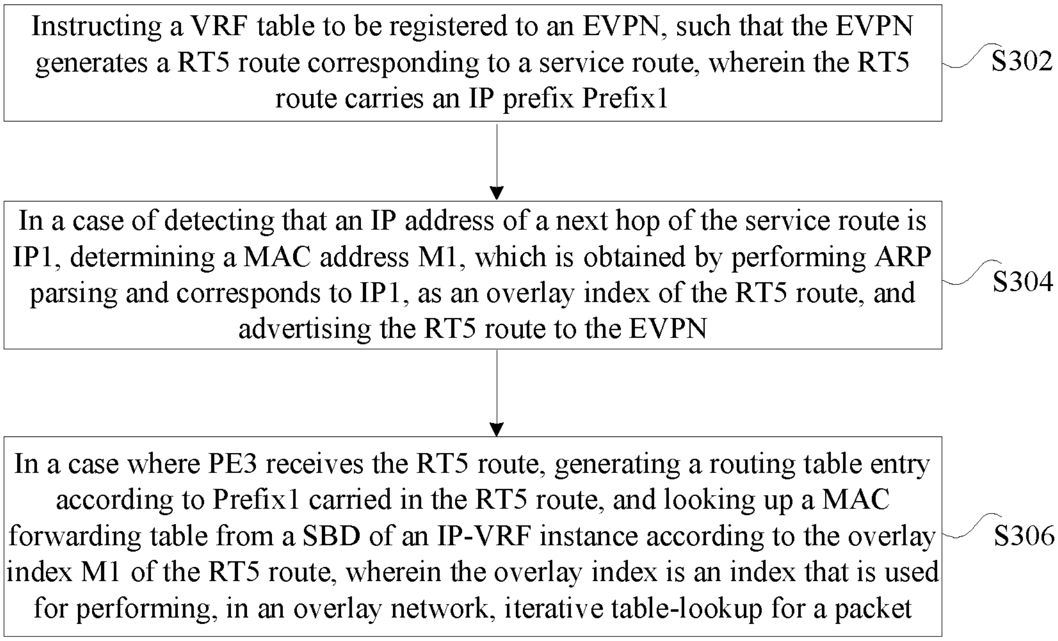
FIG. 3 is a flowchart of a method for looking up a forwarding table according to an embodiment of the present disclosure.

The present embodiment provides a method for looking up a forwarding table. FIG. 3 is a flowchart of a method for looking up a forwarding table according to an embodiment of the present disclosure, and the flowchart includes the following operations S302 to S306.

In operation S302, a VRF table is controlled to be registered to an EVPN, such that the EVPN generates a RT5 route corresponding to a service route, wherein the RT5 route carries an IP prefix Prefix1.

It should be noted that, one type of the RT5 route may be an EVPN IP prefix route.

In operation S304, in a case of detecting that an IP address of a next hop of the service route is IP1, a MAC address M1, which is obtained by performing ARP parsing and corresponds to IP1, is determined as an overlay index of the RT5 route, and the RT5 route is advertised to the EVPN.

In operation S306, in a case where PE3 receives the RT5 route, a routing table entry is generated according to Prefix1 carried in the RT5 route, and a MAC forwarding table is looked up from a SBD of an IP-VRF instance according to the overlay index M1 of the RT5 route, wherein the overlay index is an index that is used for performing, in an overlay network, iterative table-lookup for a packet.

By virtue of the above operations, a VRF table is controlled to be registered to an EVPN, such that the EVPN generates a RT5 route corresponding to a service route, wherein the RT5 route carries an IP prefix Prefix1; in a case of detecting that an IP address of a next hop of the service route is IP1, a MAC address M1, which is obtained by performing ARP parsing and corresponds to IP1, is determined as an overlay index of the RT5 route, and the RT5 route is advertised to the EVPN; and in a case where PE3 receives the RT5 route, a routing table entry is generated according to Prefix1 carried in the RT5 route, and a MAC forwarding table is looked up from a SBD of an IP-VRF instance according to the overlay index M1 of the RT5 route, wherein the overlay index is an index that is used for performing, in an overlay network, iterative table-lookup for a packet. The described technical solution solves the problem that in the case where the ESI service is busy, the traffic from PE3 to CE1 is pushed to PE2, and since there is no local routing to CE1 on PE2, the MAC forwarding table of the VPLS cannot be found according to the next hop, resulting in that PE3 cannot forward the traffic to CE1 from the ESI. By means of the described technical solution, the traffic from PE3 to CE1 can be forwarded to CE1 via the ESI. In some exemplary implementations, before operation S302 is executed, an EVPN VPLS Layer-2 instance BD1 may need to be configured for PE1, and an EVPN VPLS Layer-2 instance BD2 may need to be configured for PE2, wherein the BD1 and the BD2 do not import routes of each other.

In some exemplary implementations, in operation S306, the SBD permits importing of the routes of the BD1 and the BD2.

In some exemplary implementations, in operation S306, the SBD does not advertise an Inclusive Multicast Ethernet Tag (IMET) route to PE1 or PE2.

In some exemplary implementations, in operation S306, an IP address of an Intergraded Routing and Bridging (IRB) interface of the SBD is in an unnumbered form, and the IRB interface is bound to the IP-VRF instance.

In some exemplary implementations, before controlling the VRF table to be registered to the EVPN, such that the EVPN generates the RT5 route corresponding to the service route, the method may further include the following operation: PE1 and PE2 are controlled to be dual-homed to a Customer Edge CE1, wherein an Access Circuit AC1 of PE1 and an AC2 of PE2 belong to a same Ethernet segment ESI1.

In some exemplary implementations, before controlling the VRF table to be registered to the EVPN, such that the EVPN generates the RT5 route corresponding to the service route, the method may further include the following operations: PE1 and PE2 are controlled to respectively generate a Route Type-2 (RT2) route for the MAC address M1, and advertise the RT2 route to the EVPN; and PE3 receives the RT2 route of PE1 and PE2, wherein the RT2 route is respectively advertised by PE1 or PE2 for the BD1 or the BD2, and the RT2 route carries an Ethernet Segment Identifier ESI1 of the ES1; and PE3 generates a MAC forwarding entry according to the received RT2 route, wherein the MAC forwarding entry implements an Aliasing function via the ESI1.

In some exemplary implementations, before controlling the VRF table to be registered to the EVPN, such that the EVPN generates the RT5 route corresponding to the service route, the method may further include the following operations: PE1 and PE2 generate a Route Type-1 (RT1) route for the ESI1 and an EVPN instance, wherein the RT1 route carries Ethernet Segment (ES) information and label forwarding information; and advertise the RT1 route to the EVPN.

In some exemplary implementations, after advertising the RT1 route to the EVPN, the method may further include the following operations: PE3 receives the RT1 route advertised by PE1 and PE2; and PE3 forms Aliasing with forwarding information of the RT1 route according to the ESI1 in the MAC forwarding entry of the MAC address M1.

For better understanding, a more detailed embodiment of the present disclosure provides a method for carrying a CE MAC of a dual-homing PE in an EVPN RT5 route and for realizing, based on of an existing mature Layer-2 ESI, forwarding of Layer-3 dual-homing via the Layer-2 ESI. When the dual-homing PE advertises an RT5 route for a private network route IP3 received from CE, the dual-homing PE checks that the next hop of the IP3 route is 10.2, then designates a Router's MAC of the route as a MAC (CE MAC) acquired from ARP of 10.2 and advertises the MAC to the EVPN. A remote end queries the Layer-2 unicast forwarding of the EVPN according to the MAC information. In the embodiment, the interfaces int1/int2, to which 10.2/20.2 belongs, on CE1 have the same MAC, which is referred to as a Virtual Appliance MAC (VA-MAC).

In order to better understand the process that the remote end queries the Layer-2 unicast forwarding of the EVPN according to the MAC information, an exemplary implementation is provided as follow. According to a Router's MAC in the RT-5 route, MAC forwarding is queried in an SBD instance associated with an IP-VRF to which the RT-5 route belongs, wherein the SBD instance associated with the IP-VRF is an SBD instance whose IRB interface is bound to the IP-VRF instance.

Figure 4:
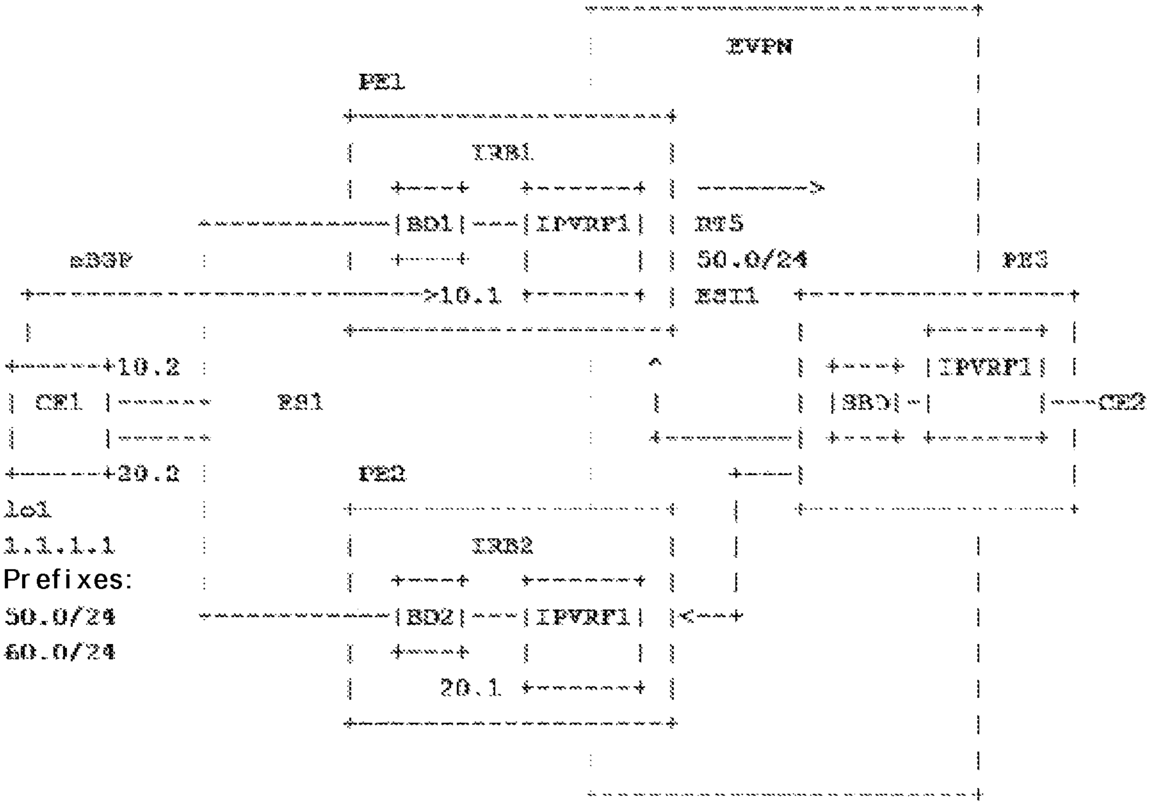
FIG. 4 is a schematic diagram (1) of a Layer-3 dual-homing network of a forwarding table according to an embodiment of the present disclosure.

FIG. 4 is a schematic diagram (1) of a Layer-3 dual-homing network of a forwarding table according to an embodiment of the present disclosure. The embodiment of the present disclosure provides a method for implementing Layer-3 PE dual homing through the CE MAC, and the method includes the following operations 1 to 16.

In operation 1, an EVPN VPLS Layer-2 instance is configured on PE1, PE2 and PE3, wherein BD1 and BD2 are independent broadcast domains, and SBD is a supplementary broadcast domain; the SBD may import a route advertised by BD1 and BD2, but the SBD itself does not need to advertise a route outwards; PE1 and PE2 are dual-homed to CE1; AC1 of PE1 and AC2 of PE2 belong to the same Ethernet segment ESI1; and one ESID is allocated for each ES instance.

In operation 2, PE1 configures an independent gateway IRB1(10.1) which is added to VPLS1 and VRF1 and is directly connected to int1(10.2) of CE1 in the same network segment; PE2 configures an independent gateway IRB2 (20.1) which is added to VPLS2 and VRF2 and is directly connected to int2(20.2) of CE1 in the same network segment; and PE3 configures an IRB which is added to VPLS3 and VRF3, is not functioned as any gateway, and is not assigned with an IP address. PE1 and CE1 establish an EBGP neighbor, and advertise the service route 50.0/24 of CE1 to PE1. CE2 behind PE3 needs to interconnect with the service route of CE1 by the IP3.

In operation 3, PE1, PE2 and PE3 respectively generate an RT3 route for BD1, BD2 and the SBD, and advertise the generated RT3 route to the EVPN, and PE3 receives the RT3 route of PE1 and PE2; and PE3 forms a broadcast domain according to the received RT3 route, wherein the network side of the broadcast domain SBD includes: PE1 and PE2.

In operation 4, PE1 and PE2 generate an RT1 route for the EVPN instance and the ES of the present device, wherein the RT1 route carries ES information and label forwarding information, and advertises the generated RT1 route to the EVPN.

In operation 5, after receiving the RT1 route advertised by PE1 and PE2, PE3 forms protection and forwarding of the ESI according to the label information and the ESID, and the next hop points to PE1/PE2 respectively.

In operation 6, the service VRFs deployed by PE1, PE2 and PE3 are respectively VRF1, VRF2 and VRF3; the attributes of the outbound and inbound RTs are the same (100:100); IRB1 of PE1 is added to VRF1, IRB2 of PE2 is added to VRF2, an interface corresponding to an H4 host of PE3 is added to VRF3, and an IRB3 is added to VRF3.

In operation 7, IRB1 of PE1 is pinged on CE1, and int1 of CE1 and IRB1 of PE1 successfully learn an ARP from each other; IRB2 of PE2 is pinged on CE1, and int2 of CE1 and IRB2 of PE1 successfully learn an ARP from each other; on PE1, IRB1 learns a VA_MAC address MAC1 of which the ARP is 10.2; on PE2, IRB2 learns a VA_MAC address MAC1 of which the ARP is CE1; the AC interfaces of PE1 and PE2 under the VPLS respectively learn the VA_MAC of CE1 as MAC1, and form an MAC unicast forwarding table pointing to the ESI1 bound to the respective AC; AC1 of PE1 generates a RT2 route, carrying ESI information (ESI1), of the MAC1 and advertises the generated RT2 route to PE3; AC2 of PE2 generates a RT2 route, carrying ESI information (ESI1), of the MAC1 and advertises the generated RT2 route to PE3.

In operation 8, a direct EBGP neighbor is established between CE1 and PE1 by using IP addresses of int1 and IRB1, and a service route 50.2/32 of CE1 is advertised to PE1.

In operation 9, PE1 receives a service route from IRB1 interface (50.2/32), and adds the service route to a VRF1 routing table to which IRB1 belongs, so as to form a local route forwarding table, wherein the outbound interface is IRB1, and the next hop is 10.2.

In operation 10, a VRF table is registered in an EVPN, the EVPN generates a corresponding RT5 route for a service route (50.0/24), wherein the RT5 route carries an IP prefix (50.0/24) and a vpn RT (100:100) attribute; it is checked that the next hop of the service route is 50.2, the outbound interface is IRB1 and the corresponding ARP is MAC1; an ARP (MAC1) learnt by the IRB and corresponding to (50.2/32) is determined as a Router's MAC of the RT5 route, and the RT5 route is advertised to the EVPN.

In operation 11, PE2 receives the RT5 route, and forms a routing table for the RT5 route, wherein the next hop is PE1.

In operation 12, upon receiving the RT5 route, PE3 determines that the outbound RT of the RT5 route is the same as the inbound RT of the VRF, adds the route into small table to form a VRF routing table, and according to the VPLS instance associated with the IRB interface under the VRF, points the Overlay Index of the corresponding VRF route to the MAC1 unicast forwarding table of the VPLS.

In operation 13, a destination IP of a service packet sent by the H4 is service IP3 (50.2); PE3 receives the packet from a VRF ingress and looks up a table from VRF3; the Overlay Index of the route is MAC1 forwarding of VPLS3; the egress corresponding to the unicast forwarding of the MAC1 in the VPLS3 is the ESI1; the next hops of ESI1 forwarding are PE1 and PE2 respectively; the routing packet is encapsulated into an Ethernet packet for forwarding, and the Ethernet packet is forwarded from an ESI and is load balanced to PE1 and PE2.

In operation 14, PE1 receives the Layer-2 forwarding packet, finds that the egress corresponding to the MAC1 is the ESI1 bound to an AC1, and forwards the packet from ACT to CE1.

In operation 15, PE2 receives the Layer-2 forwarding packet, finds that the egress corresponding to the MAC1 is the ESI1 bound to an AC2, and forwards the packet from AC2 to CET.

In operation 16, after receiving the packet, CET performs Layer-2 termination according to the VA-MAC, parses the destination IP (50.2/32), and is interconnected with the host H1 (50.2).

It should be noted that VRF1, VRF2, and VRF3 in operation 5 belong to the same service VPN, and are deployed with the same inbound and outbound RT attributes.

Obviously, the embodiments as described are only some of the embodiments of the present disclosure, and are not all of the embodiments of the present disclosure. In order to better understand the method for looking up a forwarding table, the described process will be described below in conjunction with the embodiments, but is not limited to the technical solutions of the embodiments of the present disclosure.

Embodiment 1

Figure 5:
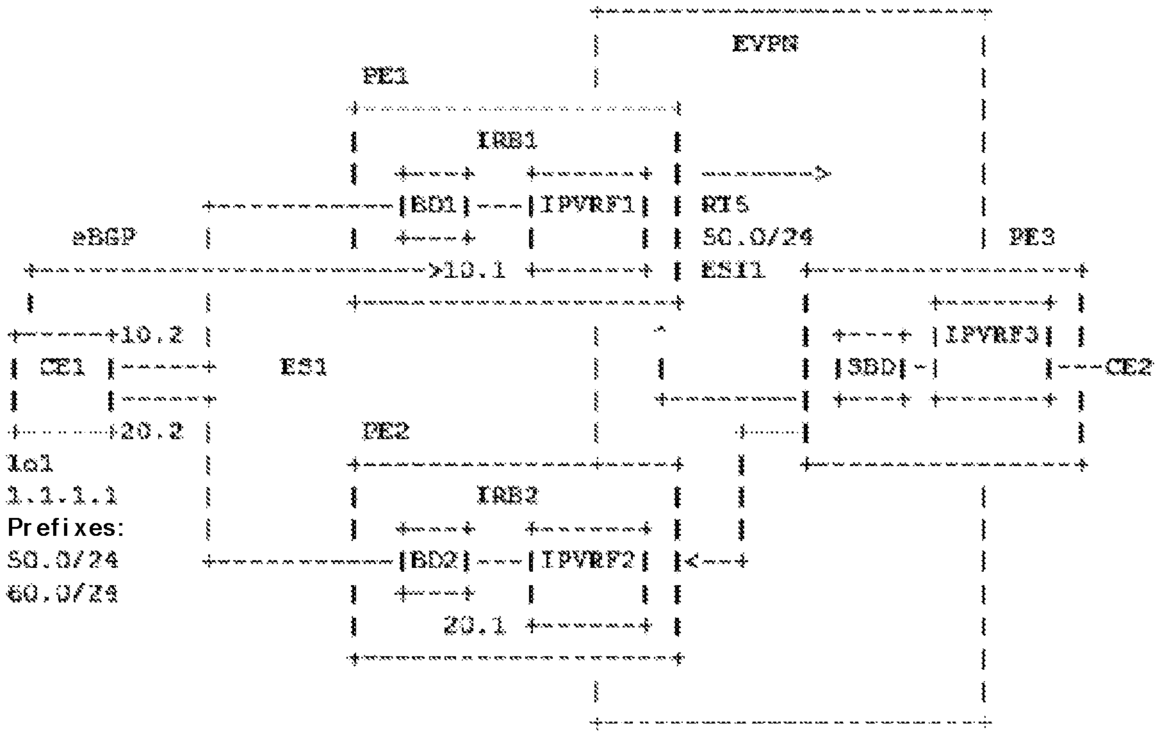
FIG. 5 is a schematic diagram (2) of a Layer-3 dual-homing network of a forwarding table according to an embodiment of the present disclosure.

The present embodiment provides a method for realizing Layer-3 PE dual homing through the CE MAC. PE1, PE2, and PE3 respectively deploy VPLS+IRB and VRFs, and the VRFs deploy the same inbound and outbound RTs (100:100); the IRBs are respectively added into the VRFs of their respective PEs; VPLS1 of PE1 generates a broadcast domain BD1, VPLS2 of PE2 generates a broadcast domain BD2, and VPLS3 of PE3 establishes a supplementary broadcast domain SBD; PE1 and PE2 are dual-homed to the interfaces int1 and int2 of CE1, and the same interface MAC, which is VA-MAC (MAC1), is configured for the interfaces int1 and int2; a direct connection interface int1 on PE1 is added to the VPLS1 to serve as AC1 of BD1, IRB1 interface address of the VPLS configured on PE1 is IP1 (10.1), which is in a direct connection network segment with the interface address IP2 (10.2) of int1 of CE1; a direct connection interface int2 on PE2 is added to VPLS2 to serve as AC2 of BD2, and the interface address IRB2 of VPLS 2 configured on PE2 is IP3 (20.1), which is in a direct connection network segment with the interface address IP4 (20.2) of int2 of CE1;

PE3 configures that IRB is added into VRF3 and VPLS3; AC1 and AC2 are added to the same ESI1 (00.10.32.33.44.55.66.77.88.99), and ES is deployed as multi-active; the host H2 behind CE1 is (50.2/32), the host H1 of CE2 is (100.2), the host H2 (100.2/32) of CE2 behind PE3 needs to interconnect with the service route H1 (50.2/32) of CE1. FIG. 5 is a schematic diagram (2) of a Layer-3 dual homing network with a forwarding table according to an embodiment of the present disclosure, as shown in FIG. 5, the method includes the following operations 101 to 115.

In operation 101, an EVPN VPLS Layer-2 instance is configured on PE1, PE2 and PE3; VPLS1 of PE1 generates a broadcast domain BD1, VPLS 2 of PE2 generates a broadcast domain BD2, and VPLS3 of PE3 establishes a Supplementary Broadcast Domain (SBD); an AC1 of PE1 and an AC2 of PE2 are configured to belong to a same Ethernet segment ESI1; and PE1 and PE2 designate an ESIDI1 (00.10.32.33.44.55.66.77.88.99) for the ESI1 instance.

In operation 102, PE1 configures an independent gateway IRB1(10.1) to join VPLS1 and VRF1, and to be directly connected to int1(10.2) of CE1 in the same network segment.

In operation 103, PE2 configures an independent gateway IRB2(20.1) to join VPLS2 and VRF2, and to be directly connected to int2(20.2) of CE1 in the same network segment.

In operation 104, PE3 configures the IRB to join VPLS3 and VRF3, without functioning as any gateway and without assigning an IP address.

In operation 105, PE1 and CE1 establish an EBGP neighbor, and advertise CE1 service route 50.0/24 to PE1.

In operation 106, PE1 generates a RT1 route for VPLS1 and the ESI1, and advertises the RT1 route to PE3; PE2 generates a RT1 route for VPLS2 and the ESI1, and advertises the RT1 route to PE3; PE3 receives the RT1 routes advertised by PE1 and PE2 to form ESI forwarding, and the next hop is respectively PE1 and PE2.

In operation 107, a ping operation triggers int2 of CE1 and int2 of PE1 to learn the ARP, PE1 learns that the ARP egress of the IP2 (10.2) is IRB1, and the corresponding MAC is VA-MAC (MAC1); PE2 learns that the ARP egress of the IP4 (20.2) is IRB2, and the corresponding MAC is VA-MAC (MAC1); AC1 of PE1 learns the MAC1, generates a forwarding of the MAC1 which is the ESI1 bound to AC1, and generates an EVPN RT2 MAC route carrying ESI1 information of AC1 and advertises the route to PE3; AC2 of PE2 learns the MAC1, and generates a forwarding of the MAC1 which is the ESI1 bound to AC2.

In operation 108, PE1 receives a service route 50.0/24 from an EBGP neighbor of CE1, adds the route to a VRF1 routing table to which IRB1 belongs, the next hop being int1 (10.2), generates an EVPN RT5 route carrying prefix information (50.0/24) and an RT attribute (100:100); at the same time, searches for an MAC1 learnt on an irb interface through an ARP protocol and corresponding to (10.2), and advertises the MAC (MAC1) of the next hop (10.2) of the route to the EVPN as a Router's MAC of the RT5 route.

In operation 109, PE3 receives the routing prefix (50.0/24) carried in the RT5 route advertised by PE1, enters a VRF3 routing table according to the RT attribute 100:100, finds VPLS3 associated with the IRB3 of VRF3, and forms an overlay index of VRF3 route (50.0/24) as an MAC1 forwarding table of VPLS3 according to the MAC1 carried in the RT5 routing; and the forwarding of the MAC1 is the ESI1.

In operation 110, CE1 and CE2 are interconnected, and a host H2 (100.2/32) of CE2 sends a packet, the destination IP of which is a host H1 (50.2/32) behind CE1.

In operation 111, PE1 receives the packet of CE2 from the interface of VRF3, searches VRF3 to find that the overlay index of the routing prefix (50.0/24) is the MAC1 of VPLS3, and searches VPLS3 for the unicast forwarding of the MAC1.

In operation 112, the egress corresponding to the MAC1 in VPLS3 is the ESI1, the next hop is PE1 and PE2, the packet is re-encapsulated to add an Ethernet header for forwarding from the Layer-2 ESI, and the traffic is respectively pushed to PE1 and PE2.

In operation 113, PE1 receives the packet of CE2 of which the destination MAC is MAC1, finds that the forwarding egress of the MAC1 is the ESI1 bound to AC1, and forwards the ESI1 from AC1 to CE1.

In operation 114, PE2 receives the packet of CE2 of which the destination MAC is MAC1, finds that the forwarding egress of the MAC1 is the ESI1 bound to AC2, and forwards the ESI1 from AC2 to CE1.

In operation 115, after receiving the packet, CE1 performs Layer-2 termination according to the VA-MAC (MAC1), parses the destination IP (50.2/32), and is interconnected to the host H1 (50.2).

Embodiment 2

Figure 6:
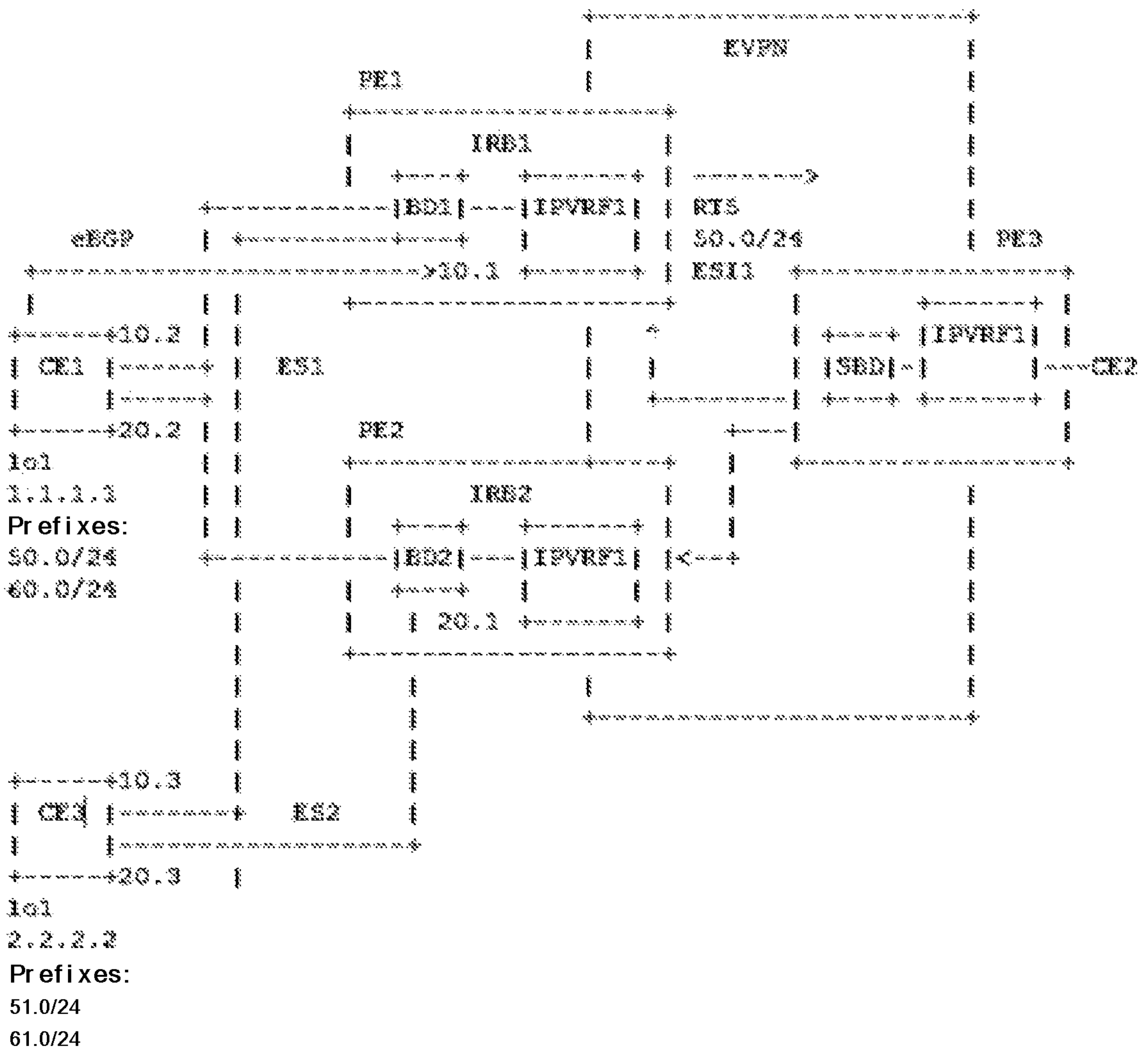
FIG. 6 is a schematic diagram of a plurality of CE dual-homing networks of a forwarding table according to an embodiment of the present disclosure.

The present embodiment provides a method for realizing Layer-3 PE dual homing through the CE MAC. The present description is the same as the embodiment 1 except for what is specifically noted. CE1 and CE3 are respectively Layer-3 dual homed to PE1 and PE2; the same interface MAC which is MAC2 is configured to the interface int11 (10.3/24) and the interface int2l (20.3/24) of CE3; and the direct connection interface serves as an AC11 of PE1 VPLS1 and an AC21 of PE2, respectively; AC11 of PE1 and AC21 of PE2 are configured to be added to ESI2 (00.10.20.30.40.50.70.80.90); the host H2 (101.2) of CE2 needs to be interconnected to the host H3 of CE3 (51.2). FIG. 6 is a schematic diagram of a plurality of CE dual-homing networks of a forwarding table according to an embodiment of the present disclosure, and as shown in FIG. 6, the flow of the method includes the following operations 201 to 215.

In operation 201, AC11 of PE1 and AC21 of PE2 are configured to belong to a same Ethernet segment ESI2, wherein PE1 and PE2 designate an ESID 12 ((00.10.20.30.40.50.70.80.90)) for an ESI2 instance.

In operation 202, this operation is the same as operation 101 except for what is specifically noted.

In operation 203, this operation is the same as operation 102 except for what is specifically noted.

In operation 204, this operation is the same as operation 103 except for what is specifically noted.

In operation 205, PE1 and CE3 establish an EBGP neighbor, and CE3 service route 51.0/24 is advertised to PE1.

In operation 206, PE1 generates an RT1 route for VPLS1 and the ESI2, and advertises the RT1 route to PE3; PE2 generates an RT1 route for VPLS2 and the ESI1, and advertises the RT1 route to PE3; PE3 receives the RT1 routes advertised by PE1 and PE2 to form ESI (ESI2) forwarding, and the next hop is respectively PE1 and PE2.

In operation 207, a ping operation triggers int21 and int11 of CE3 to learn the ARP, PE1 learns that the ARP egress of the IP5 (10.3) is IRB1, and the corresponding MAC is VA-MAC (MAC2); PE2 learns that the ARP egress of the IP6 (20.3) is IRB2, and the corresponding MAC is MAC2; AC11 of PE1 learns the MAC2, generates a Layer-2 forwarding egress of the MAC2 which is the ESI2 bound to AC11, and generates an EVPN RT2 route carrying ESI2 information of AC11 and advertises the route to PE3; AC21 of PE2 learns the MAC2, and generates a Layer-2 forwarding egress of the MAC2 which is the ESI2 bound to AC21.

In operation 208, PE1 receives a service route 51.0/24 of CE3 from IRB1 interface, adds the route into a VRF1 routing table to which IRB1 belongs, the next hop being (10.3), and generates an EVPN RT5 route carrying prefix information (51.0/24) and an RT attribute (100:100); searches for an ARP (MAC2) corresponding to the (10.3) learned by IRB1, and advertises the MAC2 corresponding to the next hop (10.3) of the RT5 route to the EVPN as a Router's MAC of the RT5 route.

In operation 209, PE3 receives the routing prefix (51.0/24) carried in the RT5 route advertised by PE1, enters a VRF3 routing table according to the RT attribute 100:100, finds VPLS3 associated with the IRB3 of VRF3, and forms an overlay index of VRF3 route (51.0/24) as an MAC2 forwarding table of VPLS3 according to the MAC2 carried in the RT5 route, wherein the MAC2 is forwarded to the ESI2.

In operation 210, CE3 and CE2 are interconnected, and a host H2 (101.2/32) of CE2 sends a packet, the destination IP of which is a host H3 (51.2/32) behind CE3.

In operation 211, PE3 receives the packet of CE2 from the interface of VRF3, searches VRF3 to find that the overlay index of the routing prefix (51.0/24) is the MAC2 of VPLS3, and searches VPLS3 for the unicast forwarding of the MAC2.

In operation 212, the egress corresponding to the MAC2 in VPLS3 is the ESI2, the next hop is PE1 and PE2, the packet is re-encapsulated to add an Ethernet header for forwarding from the Layer-2 ESI, and the traffic is respectively pushed to PE1 and PE2.

In operation 213, PE1 receives the packet of CE2 of which the destination MAC is MAC2, finds that the forwarding egress of the MAC1 is the ESI2 bound to AC11, and forwards the ESI2 from AC11 to CE3.

In operation 214, PE2 receives the packet of CE2 of which the destination MAC is MAC2, finds that the forwarding egress of the MAC2 is the ESI2 bound to AC21, and forwards the ESI2 from AC21 to CE3.

In operation 215, after receiving the packet, CE3 performs Layer-2 termination according to the VA-MAC (MAC2), parses the destination IP (51.2/32), and is interconnected to the host H1 (51.2).

Through the above description of the embodiments, it should be clearly appreciated by the person having ordinary skill in the art that the method of the embodiments above may be implemented by means of software in connection with the required universal hardware platform, and of course, can also be implemented by hardware, but in many cases the former is a more preferred implementation. Based on such an understanding, the technical solutions of this disclosure essentially, or the part contributing to the prior art may be implemented in a form of a software product. The software product is stored in a storage medium (for example, a ROM/RAM, a magnetic disk, or an optical disc), and includes several instructions for controlling a terminal (which may be a mobile phone, a computer, a server, an air conditioner, a network device, or the like) to perform the method described in the embodiments of this disclosure.

In some embodiments of the present disclosure, also provided is an apparatus for looking up a forwarding table, the apparatus is used for implementing the embodiments and preferred embodiments above, and what has been described will not be described repeatedly here. As used below, the term "module" may implement a combination of software and/or hardware of predetermined functions. Although the device described in the following embodiments is preferably implemented in software, implementation in hardware or a combination of software and hardware is also possible and conceived.

Figure 7:
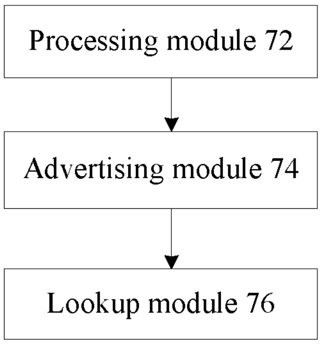
FIG. 7 is a structural block diagram of an apparatus for looking up a forwarding table according to an embodiment of the present disclosure.

FIG. 7 is a structural block diagram of an apparatus for looking up a forwarding table according to an embodiment of the present disclosure, the apparatus includes:

a processing module 72, configured to instruct a Virtual Routing and Forwarding (VRF) table to be registered to an Ethernet Virtual Private Network (EVPN), such that the EVPN generates a Route Type-5 (RT5) route corresponding to a service route, wherein the RT5 route carries an IP prefix Prefix1;

an advertising module 74, configured to, in a case of detecting that an Internet Protocol (IP) address of a next hop of the service route is IP1, determine a Media Access Control (MAC) address M1, which is obtained by performing Address Resolution Protocol (ARP) parsing and corresponds to IP1, as an overlay index of the RT5 route, and advertise the RT5 route to the EVPN; and a lookup module 76, configured to, in a case where a Provider Edge PE3 receives the RT5 route, generate a routing table entry according to Prefix1 carried in the RT5 route, and look up a MAC forwarding table from a Supplementary Broadcast Domain (SBD) of an IP-VRF instance according to the overlay index M1 of the RT5 route, wherein the overlay index is an index that is used for performing, in an overlay network, iterative table-lookup for a packet.

By virtue of the above-mentioned modules, a VRF table is controlled to be registered to an is EVPN, such that the EVPN generates a RT5 route corresponding to a service route, wherein the RT5 route carries an IP prefix Prefix1; in a case of detecting that an IP address of a next hop of the service route is IP1, a MAC address M1, which is obtained by performing ARP parsing and corresponds to IP1, is determined as an overlay index of the RT5 route, and the RT5 route is advertised to the EVPN; and in a case where PE3 receives the RT5 route, a routing table entry is generated according to Prefix1 carried in the RT5 route, and a MAC forwarding table is looked up from a SBD of an IP-VRF instance according to the overlay index M1 of the RT5 route, wherein the overlay index is an index that is used for performing, in an overlay network, iterative table-lookup for a packet. The described technical solution solves the problem that in the case where the ESI service is busy, the traffic from PE3 to CE1 is pushed to PE2, and since there is no local routing to CE1 on PE2, the MAC forwarding table of the VPLS cannot be found according to the next hop, resulting in that PE3 cannot forward the traffic to CE1 from the ESI. By means of the described technical solution, the traffic from PE3 to CE1 can be forwarded to CE1 via the ESI.

In some exemplary implementations, the processing module 72 may be further configured to configure an EVPN Virtual Private Local Area Network Service (VPLS) Layer-2 instance BD1 for PE1, and configuring an EVPN VPLS Layer-2 instance BD2 for PE2, wherein the BD1 and the BD2 do not import routes of each other.

In some exemplary implementations, the lookup module 76 may be further configured to control the SBD to permit importing of the routes of the BD1 and the BD2.

In some exemplary implementations, the lookup module 76 may be further configured to control the SBD not to advertise an Inclusive Multicast Ethernet Tag (IMET) route to PE1 or PE2.

In some exemplary implementations, the lookup module 76 may be further configured to control the SBD not to advertise an Inclusive Multicast Ethernet Tag (IMET) route to PE1 or PE2.

In some exemplary implementations, the processing module 72 may be further configured to control an IP address of an Intergraded Routing and Bridging (IRB) interface of the SBD to be in an unnumbered form, and the IRB interface to be bound to the IP-VRF instance.

In some exemplary implementations, the processing module 72 may be further configured to control PE1 and PE2 to be dual-homed to a Customer Edge CET, wherein an Access Circuit ACT of PE1 and an AC2 of PE2 belong to a same Ethernet segment ESI1.

In some exemplary implementations, the processing module 72 may be further configured to control PE1 and PE2 to respectively generate a Route Type-2 (RT2) route for the MAC address M1, and advertise the RT2 route to the EVPN; and control PE3 to receive the RT2 route of PE1 and PE2, wherein the RT2 route is respectively advertised by PE1 or PE2 for the BD1 or the BD2, and the RT2 route carries an Ethernet Segment Identifier ESI1 of the ES1; and control PE3 to generate a MAC forwarding entry according to the received RT2 route, wherein the MAC forwarding entry implements an Aliasing function via the ESI1.

In some exemplary implementations, the processing module 72 may be further configured to control PE1 and PE2 to generate a Route Type-1 (RT1) route for the ESI1 and an EVPN instance, wherein the RTT route carries Ethernet Segment (ES) information and label forwarding information; and control PE1 and PE2 to advertise the RTT route to the EVPN.

In some exemplary implementations, the lookup module 76 may be further configured to control PE3 to receive the RTT route advertised by PE1 and PE2; and control PE3 to form Aliasing with forwarding information of the RTT route according to the ESI1 in the MAC forwarding entry of the MAC address M1.

In some exemplary implementations of the embodiments, the storage medium may be configured to store computer programs for executing the following operations:

S1, controlling a Virtual Routing and Forwarding (VRF) table to be registered to an Ethernet Virtual Private Network (EVPN), such that the EVPN generates a Route Type-5 (RT5) route corresponding to a service route, wherein the RT5 route carries an IP prefix Prefix1;

S2, in a case of detecting that an Internet Protocol (IP) address of a next hop of the service route is IP1, determining a Media Access Control (MAC) address M1, which is obtained by performing Address Resolution Protocol (ARP) parsing and corresponds to IP1, as an overlay index of the RT5 route, and advertising the RT5 route to the EVPN; and S3, in a case where a Provider Edge PE3 receives the RT5 route, generating a routing table entry according to Prefix1 carried in the RT5 route, and looking up a MAC forwarding table from a Supplementary Broadcast Domain (SBD) of an IP-VRF instance according to the overlay index M1 of the RT5 route, wherein the overlay index is an index that is used for performing, in an overlay network, iterative table-lookup for a packet.

In an exemplary embodiment, the computer-readable storage medium may include, but is not limited to, any medium that can store a computer program, such as a USB flash drive, a Read-Only Memory (ROM), a Random Access Memory (RAM), a removable hard disk, a magnetic disk, or an optical disc.

For specific examples in the present embodiment, reference can be made to the examples described in the described embodiments and exemplary embodiments, and thus they will not be repeated again in the present embodiment.

The embodiments of the present disclosure further provide an electronic device, including a memory and a processor; the memory stores a computer program, and the processor is configured to run the computer program, so as to execute the operations in any one of the method embodiments.

In some exemplary implementations, in the embodiments, the processor may be arranged to execute the following operations by means of a computer program:

S1, controlling a Virtual Routing and Forwarding (VRF) table to be registered to an Ethernet Virtual Private Network (EVPN), such that the EVPN generates a Route Type-5 (RT5) route corresponding to a service route, wherein the RT5 route carries an IP prefix Prefix1;

S2, in a case of detecting that an Internet Protocol (IP) address of a next hop of the service route is IP1, determining a Media Access Control (MAC) address M1, which is obtained by performing Address Resolution Protocol (ARP) parsing and corresponds to IP1, as an overlay index of the RT5 route, and advertising the RT5 route to the EVPN; and S3, in a case where a Provider Edge PE3 receives the RT5 route, generating a routing table entry according to Prefix1 carried in the RT5 route, and looking up a MAC forwarding table from a Supplementary Broadcast Domain (SBD) of an IP-VRF instance according to the overlay index M1 of the RT5 route, wherein the overlay index is an index that is used for performing, in an overlay network, iterative table-lookup for a packet.

In an exemplary embodiment, the electronic device may further include a transmission device and an input/output device, wherein the transmission device is connected to the processor, and the input/output device is connected to the processor.

For specific examples in the present embodiment, reference can be made to the examples described in the described embodiments and exemplary embodiments, and thus they will not be repeated again in the present embodiment.

Obviously, those having ordinary skill in the art should understand that the modules or operations in some embodiments of the present disclosure can be implemented by using a general computing device, and they can be integrated in a single computing device, and can also be distributed over a network consisting of a plurality of computing devices. They may be implemented by using executable program codes of the computing devices. Thus, they can be stored in a storage device and executed by the computing devices. Furthermore, in some cases, the shown or described operations may be executed in an order different from that described here, or they can be respectively implemented by individual Integrated Circuit modules, or they can be implemented by making a plurality of the modules or operations into a single Integrated Circuit module. Thus, the present disclosure is not limited to any specific hardware and software combinations.

The content above only relates to preferred embodiments of the present disclosure, and is not intended to limit the present disclosure. For a person having ordinary skill in the art, the present disclosure may have various modifications and changes. Any modifications, equivalent replacements, improvements, etc. made within the principle of the present disclosure shall all fall within the scope of protection of the present disclosure.

What is claimed is:

1. A method for looking up a forwarding table, comprising:

controlling, by a Provider Edge PE1 or a PE2, a Virtual Routing and Forwarding (VRF) table to be registered to an Ethernet Virtual Private Network (EVPN), such that the EVPN generates a Route Type-5 (RT5) route corresponding to a service route, wherein the RT5 route carries an IP prefix Prefix1;

in a case where the PE1 or the PE2 detects that an Internet Protocol (IP) address of a next hop of the service route is IP1, determining, by the PE1 or the PE2, a Media Access Control (MAC) address M1, which is obtained by performing Address Resolution Protocol (ARP) parsing and corresponds to IP1, as an overlay index of the RT5 route, and advertising, by the PE1 or the PE2, the RT5 route to the EVPN; and in a case where a PE3 receives the RT5 route, generating, by the PE3, a routing table entry according to Prefix1 carried in the RT5 route, and looking up, by the PE3, a MAC forwarding table from a Supplementary Broadcast Domain (SBD) of an IP-VRF instance according to the overlay index M1 of the RT5 route, wherein the overlay index is an index that is used for performing, in an overlay network, iterative table-lookup for a packet.

2. The method for looking up a forwarding table according to claim 1, wherein the SBD does not advertise an Inclusive Multicast Ethernet Tag (IMET) route to the PE1 or the PE2.

3. The method for looking up a forwarding table according to claim 2, wherein before controlling the VRF table to be registered to the EVPN, such that the EVPN generates the RT5 route corresponding to the service route, the method further comprises:

controlling the PE1 and the PE2 to respectively generate a Route Type-2 (RT2) route for the MAC address M1, and advertise the RT2 route to the EVPN; and receiving, by the PE3, the RT2 route of the PE1 and the PE2, wherein the RT2 route is respectively advertised by the PE1 or the PE2 for the BLin or the BD2, and the RT2 route carries an Ethernet Segment Identifier ESI1 of the ES1; and generating, by the PE3, a MAC forwarding entry according to the received RT2 route, wherein the MAC forwarding entry implements an Aliasing function via the ESI1.

4. The method for looking up a forwarding table according to claim 3, wherein before controlling the VRF table to be registered to the EVPN, such that the EVPN generates the RT5 route corresponding to the service route, the method further comprises:

generating, by the PE1 and the PE2, a Route Type-1 (RT1) route for the ESI1 and an EVPN instance, wherein the RT1 route carries Ethernet Segment(ES) information and label forwarding information; and advertising the RT1 route to the EVPN.

5. The method for looking up a forwarding table according to claim 4, wherein after advertising the RT1 route to the EVPN, the method further comprises:

receiving, by the PE3, the RT1 route advertised by the PE1 and the PE2; and forming, by the PE3, Aliasing with forwarding information of the RT1 route according to the ESI1 in the MAC forwarding entry of the MAC address M1.

6. The method for looking up a forwarding table according to claim 1, wherein before controlling the VRF table to be registered to the EVPN, such that the EVPN generates the RT5 route corresponding to the service route, the method further comprises:

configuring an EVPN Virtual Private Local Area Network Service (VPLS) Layer-2 instance BLin for the PE1, and configuring an EVPN VPLS Layer-2 instance BD2 for the PE2, wherein the BLin and the BD2 do not import routes of each other.

7. The method for looking up a forwarding table according to claim 6, further comprising:

controlling the PE1 and the PE2 to be dual-homed to a Customer Edge CE1, wherein an Access Circuit AC1 of the PE1 and an AC2 of the PE2 belong to a same Ethernet segment ESI1.

8. The method for looking up a forwarding table according to claim 1, wherein the SBD permits importing of the routes of the BLin and the BD2.

9. The method for looking up a forwarding table according to claim 1, wherein an IP address of an Intergraded Routing and Bridging (IRB) interface of the SBD is in an unnumbered form, and the IRB interface is bound to the IP-VRF instance.

10. The method according to claim 1, wherein the RT5 route is an EVPN IP prefix route.

11. A non-transitory computer-readable storage medium storing a computer program, wherein the computer program, when running on a processor, causes the processor to execute following operations:

controlling, by a Provider Edge PE1 or a PE2, a Virtual Routing and Forwarding (VRF) table to be registered to an Ethernet Virtual Private Network (EVPN), such that the EVPN generates a Route Type-5 (RT5) route corresponding to a service route, wherein the RT5 route carries an IP prefix Prefix1;

in a case where the PE1 or the PE2 detects that an Internet Protocol (IP) address of a next hop of the service route is IP1, determining, by the PE1 or the PE2, a Media Access Control (MAC) address M1, which is obtained by performing Address Resolution Protocol (ARP) parsing and corresponds to IP1, as an overlay index of the RT5 route, and advertising, by the PE1 or the PE2, the RT5 route to the EVPN; and in a case where a PE3 receives the RT5 route, generating, by the PE3, a routing table entry according to Prefix1 carried in the RT5 route, and looking up, by the PE3, a MAC forwarding table from a Supplementary Broadcast Domain (SBD) of an IP-VRF instance according to the overlay index M1 of the RT5 route, wherein the overlay index is an index that is used for performing, in an overlay network, iterative table-lookup for a packet.

12. A system, comprising a Provider Edge PE1, a PE2 and a PE3 which are configured to execute following operations:

controlling, by the PE1 or the PE2, a Virtual Routing and Forwarding (VRF) table to be registered to an Ethernet Virtual Private Network (EVPN), such that the EVPN generates a Route Type-5 (RT5) route corresponding to a service route, wherein the RT5 route carries an IP prefix Prefix1;

in a case where the PE1 or the PE2 detects that an Internet Protocol (IP) address of a next hop of the service route is IP1, determining, by the PE1 or the PE2, a Media Access Control (MAC) address M1, which is obtained by performing Address Resolution Protocol (ARP) parsing and corresponds to IP1, as an overlay index of the RT5 route, and advertising, by the PE1 or the PE2, the RT5 route to the EVPN; and in a case where the PE3 receives the RT5 route, generating, by the PE3, a routing table entry according to Prefix1 carried in the RT5 route, and looking up, by the PE3, a MAC forwarding table from a Supplementary Broadcast Domain (SBD) of an IP-VRF instance according to the overlay index M1 of the RT5 route, wherein the overlay index is an index that is used for performing, in an overlay network, iterative table-lookup for a packet.

13. The electronic device according to claim 12, wherein the processor is configured to run the computer program to further execute following operations:

controlling the SBD to permit importing of the routes of the BLin and the BD2.

14. The electronic device according to claim 13, wherein the processor is configured to run the computer program to further execute following operations before controlling the VRF table to be registered to the EVPN, such that the EVPN generates the RT5 route corresponding to the service route:

controlling the PEL and the PE2 to respectively generate a Route Type-2 (RT2) route for the MAC address M1, and advertise the RT2 route to the EVPN; and receiving, by the PE3, the RT2 route of the PE1 and the PE2, wherein the RT2 route is respectively advertised by the PE1 or the PE2 for the BLin or the BD2, and the RT2 route carries an Ethernet Segment Identifier ESI1 of the ES1; and generating, by the PE3, a MAC forwarding entry according to the received RT2 route, wherein the MAC forwarding entry implements an Aliasing function via the ESI1.

15. The electronic device according to claim 14, wherein the processor is configured to run the computer program to further execute following operations before controlling the VRF table to be registered to the EVPN, such that the EVPN generates the RT5 route corresponding to the service route:

generating, by the PE1 and the PE2, a Route Type-1 (RT1) route for the ESI1 and an EVPN instance, wherein the RT1 route carries Ethernet Segment (ES) information and label forwarding information; and advertising the RT1 route to the EVPN.

16. The electronic device according to claim 15, wherein the processor is configured to run the computer program to further execute following operations after advertising the RT1 route to the EVPN:

receiving, by the PE3, the RT1 route advertised by the PE1 and the PE2; and forming, by the PE3, Aliasing with forwarding information of the RT1 route according to the ESI1 in the MAC forwarding entry of the MAC address M1.

17. The electronic device according to claim 12, wherein the processor is configured to run the computer program to further execute following operations before controlling the VRF table to be registered to the EVPN, such that the EVPN generates the RT5 route corresponding to the service route:

configuring an EVPN Virtual Private Local Area Network Service (VPLS) Layer-2 instance BLin for the PE1, and configuring an EVPN VPLS Layer-2 instance BD2 for the PE2, wherein the BLin and the BD2 do not import routes of each other.

18. The electronic device according to claim 17, wherein the processor is configured to run the computer program to further execute following operations:

controlling the PE1 and the PE2 to be dual-homed to a Customer Edge CE1, wherein an Access Circuit AC1 of the PE1 and an AC2 of the PE2 belong to a same Ethernet segment ESI1.

19. The electronic device according to claim 12, wherein the processor is configured to run the computer program to further execute following operations:

controlling the SBD not to advertise an Inclusive Multicast Ethernet Tag (IMET) route to the PE1 or the PE2.

20. The electronic device according to claim 12, wherein the processor is configured to run the computer program to further execute following operations:

controlling an IP address of an Intergraded Routing and Bridging (IRB) interface of the SBD to be in an unnumbered form, and controlling the IRB interface to be bound to the IP-VRF instance.

* * * * *